(12) United States Patent
Chern et al.

(10) Patent No.: US 12,399,879 B2
(45) Date of Patent: Aug. 26, 2025

(54) APPROXIMATE k NEAREST NEIGHBORS ON HARDWARE ACCELERATORS

(71) Applicant: Google LLC, Mountain View, CA (US)

(72) Inventors: Felix Ren-Chyan Chern, New York, NY (US); Blake Alan Hechtman, Mountain View, CA (US); Andrew Thomas Davis, Menlo Park, CA (US); Ruiqi Guo, Jersey City, NJ (US); Sanjiv Kumar, Jericho, NY (US); David Alexander Majnemer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/341,697

(22) Filed: Jun. 26, 2023

(65) Prior Publication Data

US 2023/0418797 A1    Dec. 28, 2023

Related U.S. Application Data

(60) Provisional application No. 63/355,542, filed on Jun. 24, 2022.

(51) Int. Cl.
*G06F 16/00* (2019.01)
*G06F 16/22* (2019.01)
*G06F 16/28* (2019.01)

(52) U.S. Cl.
CPC ........ *G06F 16/2237* (2019.01); *G06F 16/285* (2019.01)

(58) Field of Classification Search
CPC ............... G06F 16/2237; G06F 16/285; G06F 16/24569; G06F 16/2458
See application file for complete search history.

(56) References Cited

U.S. PATENT DOCUMENTS

| | | | | |
|---|---|---|---|---|
| 4,493,048 A | * | 1/1985 | Kung | ............. G06F 17/16 708/607 |
| 5,950,189 A | * | 9/1999 | Cohen | ............. G06F 16/3347 707/999.005 |

(Continued)

OTHER PUBLICATIONS

Andoni et al., "Practical and optimal LSH for angular distance," Paper, Presented at the 29th Conference on Neural Information Processing Systems, Montreal Canada, Dec. 7-12, 2015; Advances in Neural Information Processing Systems 28, Jun. 2016, pp. 1-9.

(Continued)

*Primary Examiner* — Alexander Khong
(74) *Attorney, Agent, or Firm* — Fish & Richardson P.C.

(57) ABSTRACT

Methods, systems, and apparatus, including computer programs encoded on computer storage media, for performing a kNN computation using a hardware accelerator. One of the methods includes obtaining a set of one or more query vectors; obtaining a set of database vectors; and performing, on a hardware accelerator and for each query vector in the set, a search for the k most similar database vectors to the query vector, comprising: computing, by circuitry of the hardware accelerator and for each query vector, a respective similarity value between the query vector and each database vector; and for each query vector, identifying, by the hardware accelerator and for each bin, (i) an index of the most similar database vector within the bin and (ii) the respective similarity value for the most similar database vector within the bin.

20 Claims, 4 Drawing Sheets

(56) References Cited

U.S. PATENT DOCUMENTS

| | | | |
|---|---|---|---|
| 2005/0094863 A1* | 5/2005 | Bergman Reuter | G06T 7/001 382/145 |
| 2019/0065594 A1* | 2/2019 | Lytkin | G06F 16/9536 |
| 2020/0192903 A1* | 6/2020 | Bansal | G06F 16/2237 |
| 2020/0234795 A1* | 7/2020 | Wu | G16B 50/00 |
| 2021/0089363 A1* | 3/2021 | Bergsma | G06F 9/5027 |
| 2021/0133190 A1* | 5/2021 | Voelker | G06F 16/2237 |
| 2021/0319022 A1* | 10/2021 | Makkadayil | G06F 16/24542 |
| 2022/0365955 A1* | 11/2022 | Ramamohan | G06F 16/338 |

OTHER PUBLICATIONS

Aumüller et al., "ANN-Benchmarks: A Benchmarking Tool For Approximate Nearest Neighbor Algorithms," Paper, Presented at the 10th International Conference on Similarity Search and Applications, Munich, Germany, Oct. 4-6, 2017; Information Systems, Jan. 2020, 87:13 pages.

Babenko et al., "Efficient Indexing of Billion-Scale Datasets of Deep Descriptors," Paper, Presented at the Conference on Computer Vision and Pattern Recognition, Las Vegas, NV, Jun. 27-30, 2016; Proceedings of the IEEE Conference on Computer Vision and Pattern Recognition, Jun. 2016, pp. 2055-2063.

Babenko et al., "The Inverted Multi-Index," IEEE Transactions on Pattern Analysis and Machine Intelligence, Jun. 2015, 37(6): 1247-1260.

Baranchuk et al., "Revisiting the Inverted Indices for Billion-Scale Approximate Nearest Neighbors," Paper, Presented at the European Conference on Computer Vision, Munich, Germany, Sep. 8-14, 2018; Lecture Notes in Computer Science, Oct. 2018, 11216:1-15.

Beyer et al., "When is 'Nearest Neighbor' Meaningful?," Paper, Presented at the 7th International Conference on Database Theory, Jerusalem, Israel, Jan. 10-12, 1999; Lecture Notes in Computer Science, Dec. 1998, 1540:19 pages.

Borgeaud et al., "Improving Language Models by Retrieving from Trillions of Tokens," CoRR, Submitted on Dec. 8, 2021, arXiv:2112. 04426v1, pp. 1-43.

Cer et al., "Universal Sentence Encoder," CoRR, Submitted on Apr. 12, 2018, arXiv: 1803.11175v2, 7 pages.

Chen et al., "SPANN: Highly-Efficient Billion-Scale Approximate Nearest Neighborhood Search," Paper, Presented at the 35th Conference on Neural Information Processing Systems, Virtual Event, Dec. 6-14, 2021; Advances in Neural Information Processing Systems 34, May 2022, pp. 1-14.

Choi et al., "A Roofline Model of Energy," Paper, Presented at the 27th International Symposium on Parallel and Distributed Processing, Cambridge, MA, May 20-24, 2013; Proceedings of the 2013 IEEE International Symposium on Parallel and Distributed Processing, Oct. 2013, pp. 661-672.

Dasgupta et al., "Random projection trees and low dimensional manifolds," Paper, Presented at the Symposium on Theory of Computing, Victoria, Canada, May 17-20, 2008; Proceedings of the Fortieth Annual ACM Symposium on Theory of Computing, May 2008, 10 pages.

Ding et al., "An Instruction Roofline Model for GPUs," Paper, Presented at the International Workshop on Performance Modeling, Benchmarking and Simulation of High Performance Computer Systems, Denver, CO, Nov. 18, 2019; Proceedings of the International Workshop on Performance Modeling, Benchmarking and Simulation of High Performance Computer Systems, Nov. 2019, pp. 7-18.

Dongarra et al., "A Set of Level 3 Basic Linear Algebra Subprograms," ACM Transactions on Mathematical Software, Mar. 1990, 16(1): 1-17.

Github.com[online], "JAX: Composable Transformations of Python+ NumPy Programs," Nov. 22, 2018, retrieved Sep. 18, 2024, retrieved from URL<https://github.com/google/jax>, 8 pages.

Gu et al., "Statistical Analysis of Nearest Neighbor Methods for Anomaly Detection," Paper, Presented at the 33rd Conference on Neural Information Processing Systems, Vancouver, Canada, Dec. 8-14, 2019; Advances in Neural Information Processing Systems 32, Jun. 2020, pp. 1-11.

Guo et al., "Accelerating Large-Scale Inference with Anisotropic Vector Quantization," Paper, Presented at the 37th International Conference on Machine Learning, Virtual Event, Jul. 13-18, 2020; Proceedings of Machine Learning Research, Mar. 2021, 119:10 pages.

Guu et al., "REALM: Retrieval Augmented Language Model Pre-Training," CoRR, Submitted on Feb. 10, 2020, arXiv:2002. 08909v1, 12 pages.

Impagliazzo et al., "The Complexity of k-SAT," Paper, Presented at Proceedings of the 14th Annual IEEE Conference on Computational Complexity, Atlanta, GA, May 4-6, 1999, 4 pages; Journal of Computer and System Sciences, Mar. 2001, 62(2):367-375.

Jayaram et al., "DiskANN: Fast Accurate Billion-Point Nearest Neighbor Search on a Single Node," Paper, Presented at the 33rd Conference on Neural Information Processing Systems, Vancouver, Canada, Dec. 8-14, 2019; Advances in Neural Information Processing Systems 32, Jun. 2020, pp. 1-11.

Jegou et al., "Product Quantization for Nearest Neighbor Search," IEEE Transactions on Pattern Analysis and Machine Intelligence, Jan. 2011, 33(1):117-128.

Jia et al., "Scaling Up Visual and Vision-Language Representation Learning with Noisy Text Supervision," Paper, Presented at the 38th International Conference on Machine Learning, Virtual Conference, Jul. 18-24, 2021; Proceedings of Machine Learning Research, Apr. 2022, 139:13 pages.

Johnson et al., "Billion-Scale Similarity Search with GPUs," IEEE Transactions on Big Data, Jun. 2019, 7(3):535-547.

Jouppi et al., "In-Datacenter Performance Analysis of a Tensor Processing Unit," Paper, Presented at the ACM/IEEE 44th Annual International Symposium on Computer Architecture, Toronto, Canada, Jun. 24-28, 2017; Proceedings of the 44th Annual International Symposium on Computer Architecture, Jun. 24, 2017, pp. 1-12.

Lindgren et al., "Efficient Training of Retrieval Models Using Negative Cache," Paper, Presented at 35th Conference on Neural Information Processing Systems, Virtual Event, Dec. 6-14, 2021; Advances in Neural Information Processing Systems 34, May 2022, pp. 1-13.

Liu, "Learning to rank for information retrieval," Foundations and Trends in Information Retrieval, Mar. 1, 2009, 3(3):225-331.

Lopes et al., "Exploring GPU performance, power and energy-efficiency bounds with Cache-aware Roofline Modeling," Paper, Presented at 2017 IEEE International Symposium on Performance Analysis of Systems and Software, Santa Rosa, CA, Apr. 24-25, 2017; Proceedings of the 2017 IEEE International Symposium on Performance Analysis of Systems and Software, Aug. 2017, pp. 259-268.

Malkov et al., "Efficient and Robust Approximate Nearest Neighbor Search Using Hierarchical Navigable Small World Graphs," IEEE transactions on Pattern Analysis and Machine Intelligence, Apr. 2020, 42(4):824-836.

Markidis et al., "NVIDIA Tensor Core Programmability, Performance & Precision," Paper, Presented at the 2018 IEEE International Parallel and Distributed Processing Symposium Workshops, Vancouver, Canada, May 21-25, 2018; Proceedings of the 2018 IEEE International Parallel and Distributed Processing Symposium Workshops, Aug. 2018, 10 pages.

Monroe et al., "Randomized Selection on the GPU," Paper, Presented at the 2011 High Performance Graphics Conference, Vancouver, Canada, Aug. 5-7, 2011; AProceedings of the ACM SIG-GRAPH Symposium on High Performance Graphics, Aug. 2011, pp. 89-98.

Muja et al., "Scalable Nearest Neighbor Algorithms for High Dimensional Data," IEEE Transactions on Pattern Analysis and Machine Intelligence, Oct. 2014, 36(11):2227-2240.

Neyshabur et al., "On Symmetric and Asymmetric LSHs for Inner Product Search," Paper, Presented at the 32nd International Conference on Machine Learning, Lille, France, Jul. 6-11, 2015; Journal of Machine Learning Research, Jul. 2015, 37:9 pages.

Norrie et al., "The Design Process for Google's Training Chips: TPUv2 and TPUv3," IEEE Micro, Feb. 2021, 41(2):56-63.

(56) References Cited

OTHER PUBLICATIONS

Omar et al., "Machine Learning Techniques for Anomaly Detection: An Overview," International Journal of Computer Applications, Jan. 2013, 79(2):33-41.

Pennington et al., "GloVe: Global Vectors for Word Representation," Paper, Presented at the 2014 Conference on Empirical Methods in Natural Language Processing, Doha, Qatar, Oct. 25-29, 2014; Proceedings of the 2014 Conference on Empirical Methods in Natural Language Processing, Oct. 2014, pp. 1532-1543.

Ren et al., "HM-ANN: Efficient Billion-Point Nearest Neighbor Search on Heterogeneous Memory," Paper, Presented at the 34th Conference on Neural Information Processing Systems, Virtual Event, Dec. 6-12, 2020; Advances in Neural Information Processing Systems 33, Jul. 2021, pp. 1-13.

Rubinstein, "Hardness of Approximate Nearest Neighbor Search," Presented at Proceedings of the 50th Annual Acm Sigact Symposium on Theory of Computing, Los Angeles, CA, Jun. 25-29, 2018; CoRR, Submitted on Mar. 2, 2018, arXiv: 1803.00904v1, pp. 1-29.

Sarwar et al., "Recommender Systems for Large-scale E-Commerce: Scalable Neighborhood Formation Using Clustering," Paper, Presented at the Fifth International Conference on Computer and Information Technology, Shanghai, China, Sep. 21-23, 2005; Proceedings of the Fifth International Conference on Computer and Information Technology, Sep. 2005, 6 pages.

Shanbhag et al., "Efficient Top-K Query Processing on Massively Parallel Hardware," Paper, Presented at Proceedings of the 2018 International Conference on Management of Data, Houston, TX, Jun. 10-15, 2018; Proceedings of the 2018 International Conference on Management of Data, May 27, 2018, 14 pages.

Shazeer et al., "Outrageously Large Neural Networks: The Sparsely-Gated Mixture-of-Experts Layer," CoRR, Submitted on Jan. 23, 2017, arXiv:1701.06538v1, pp. 1-19.

Tensorflow.org [online], "TensorFlow: Large-Scale Machine Learning on Heterogeneous Distributed Systems," Nov. 2015, retrieved on Sep. 23, 2024, retrieved from URL<https://www.tensorflow.org/extras/tensorflow-whitepaper2015.pdf>, 19 pages.

Van der Maaten et al., "Dimensionality Reduction: A Comparative Review," Journal of Machine Learning Research, Oct. 2009, 10(66-71): 1-36.

Wang et al., "Hashing for Similarity Search: A Survey," CoRR, Submitted on Aug. 13, 2014, arXiv: 1408.2927v1, 29 pages.

Wang et al., "Learning to Hash for Indexing Big Data—A Survey," Proceedings of the IEEE, Dec. 18, 2015, 104(1):34-57.

Wang et al., "Time-Based Roofline for Deep Learning Performance Analysis," Paper, Presented at IEEE/ACM Fourth Workshop on Deep Learning on Supercomputers (DLS), Atlanta, GA, Nov. 11, 2020, 10 pages.

Williams et al., "Roofline: An Insightful Visual Performance Model for Multicore Architectures, " Communications of the ACM, Apr. 2009, 52(4):65-76.

Yang et al., "Hierarchical Roofline Performance Analysis for Deep Learning Applications," CoRR, Submitted on Nov. 25, 2020, arXiv:2009.05257v4, 9 pages.

Zhao et al., "Recommending What Video to Watch Next: A Multitask Ranking System," Paper, Presented at the Thirteenth ACM Conference on Recommender Systems, Copenhagen, Denmark, Sep. 16-20, 2019; Proceedings of the 13th ACM Conference on Recommender Systems, Sep. 10, 2019, pp. 43-51.

Zhao et al., "SONG: Approximate Nearest Neighbor Search on GPU," Paper, Presented at the IEEE 36th International Conference on Data Engineering, Dallas, TX, Apr. 20-24, 2020; Proceedings of the IEEE 36th International Conference on Data Engineering, Sep. 2020, 12 pages.

* cited by examiner

APPROXIMATE k NEAREST NEIGHBORS ON HARDWARE ACCELERATORS

CROSS-REFERENCE TO RELATED APPLICATION

This application claims priority to U.S. Provisional Application No. 63/355,542, filed on Jun. 24, 2022. The disclosure of the prior application is considered part of and is incorporated by reference in the disclosure of this application.

BACKGROUND

This specification generally relates to performing a k nearest neighbor (kNN) computation on a hardware accelerator.

A kNN computation is a computation that receives a query vector and a set of database vectors and searches for the k database vectors that are most similar to the query vector according to some similarity measure.

SUMMARY

This specification describes a system implemented as computer programs on one or more computers in one or more locations that performs a k nearest neighbor (kNN) computation.

The system performs the kNN computation by receiving a set of query vectors and a set of database vectors and, for each query vector, searching for the k database vectors that are most similar to the query vector according to some similarity measure.

For some similarity measures, e.g., Euclidean distance or other distance measures, the most similar database vectors are those that are closest to the query vector (have the smallest similarity measure with the query vector). For some other similarity measures, e.g., inner product, the most similar database vectors are those that have the largest similarity measure with the query vector.

K can generally be any positive integer, i.e., any integer greater than or equal to one, but is generally much smaller than the total number of database vectors in the set. For example, if there are a million database vectors, the value of k can be less than two thousand and, in some cases, can be less than one hundred, less than fifty, or less than fifteen.

More specifically, this specification describes how the kNN computation can be performed efficiently by a hardware accelerator that has circuitry that is configured to perform matrix multiplication in hardware. As a particular example, the hardware accelerator can be a machine learning accelerator like a graphics processing unit (GPU), a tensor processing unit (TPU), or a different type of accelerator that has special-purpose hardware for performing various linear algebra computations.

The subject matter described in this specification can be implemented in particular embodiments so as to realize one or more of the following advantages.

This specification describes techniques for performing a kNN computation on a hardware accelerator, e.g., a machine learning accelerator or other accelerator that includes special purpose hardware for performing linear algebra operations, e.g., matrix multiplication.

In particular, the described algorithm for performing the kNN computation achieves peak performance on the target accelerator, e.g., on a TPU or a GPU, and outperforms state-of-the-art accelerator-based kNN algorithms with a similar level of recall. That is, given a target recall, the described algorithm outperforms, e.g., in terms of computational efficiency, state-of-the-art accelerator-based kNN algorithms that achieve the same target recall. For example, for a given recall, the described techniques can achieve state of the art results in terms of computation time when deployed on a suitable hardware accelerator.

In particular, as will be described in more detail below, the described techniques can achieve this state-of-the-art performance by minimizing the number of coefficient-wise operations (COPs) that are required to be performed as part of the search.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
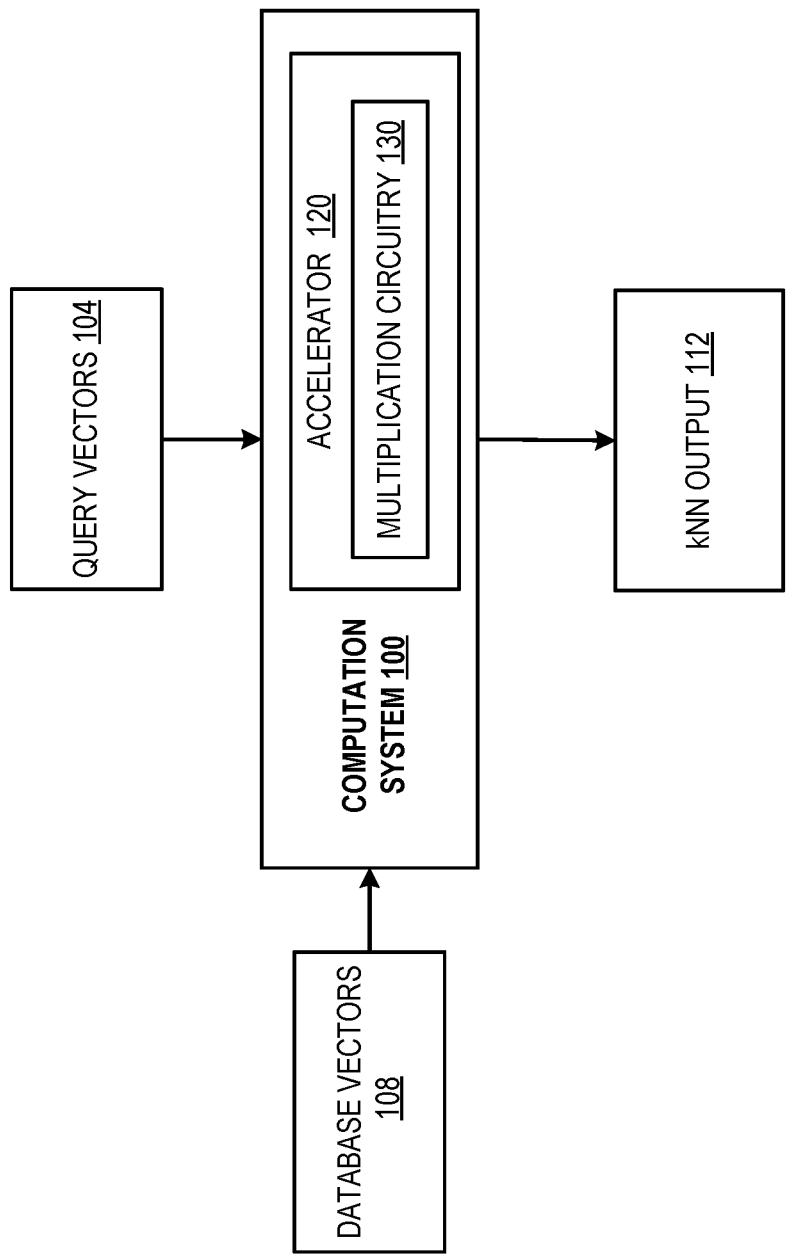
FIG. 1 shows an example system for performing a kNN computation.

FIG. 1 shows an example system 100 for performing a k-nearest neighbor (kNN) search computation.

Performing a kNN search has a wide range of applications in machine learning and information retrieval systems.

Some examples of systems that make use of kNN search include image search systems, semantic textual retrieval systems, anomaly detection systems, recommendation systems, and, more generally, any of a variety of systems that serve as a component for downstream tasks.

Thus, accurately performing the kNN search can be important to the performance of a variety of machine learning and information retrieval systems.

However, given the large number of vectors that need to be searched in many real-world, industrial use cases, the kNN search can be computationally expensive and in some cases can bottleneck the performance computational efficiency of the machine learning or information retrieval system due to excessive latency, excessive memory usage, and so on.

To alleviate these issues, the system 100 performs the kNN search in a computationally efficient manner while still maintaining a high degree of accuracy.

To perform the computation, the system 100 receives a set of query vectors 104 and a set of database vectors 108 and, for each query vector 104, searches for the k database vectors 108 that are most similar to the query vector 104 according to some similarity measure.

The query vectors 104 and the database vectors 108 generally have the same dimensionality, i.e., each query vector q and each database vector x have the same number of entries D.

For some similarity measures, e.g., Euclidean distance or other distance measures, the most similar database vectors are those that are closest to the query vector (have the smallest similarity measure with the query vector).

For some other similarity measures, e.g., inner product, the most similar database vectors are those that have the largest similarity measure with the query vector.

K can generally be any positive integer, i.e., any integer greater than or equal to one, but is generally much smaller than the total number N of database vectors in the set.

Thus, the system 100 identifies, as the output 112 of the kNN computation, a respective set of k database vectors for each query vector 104 and provides the output 112 to, e.g., a downstream system from which the query vectors 104 were received.

In some cases, the system 100 provides the sets of k database vectors as output.

In some other cases, the system 100 provides data identifying the k database vectors as output, e.g., by providing the indices of the k database vectors within the set of database vectors.

In yet other cases, the system 100 can provide an output 112 that identifies more than k database vectors for each query vector and the downstream system can further refine the database vectors identified in the output 112 to generate the k database vectors for each query vector.

More specifically, the system 100 performs the kNN computation efficiently using a hardware accelerator 120 that has circuitry 130 that is configured to perform matrix multiplication in hardware. In other words, the hardware accelerator 120 is a special-purpose computer chip that has circuitry 130 that performs matrix multiplication in hardware.

For example, the hardware accelerator 120 can be a machine learning accelerator like a graphics processing unit (GPU), a tensor processing unit (TPU), or a different type of accelerator that has special-purpose hardware for performing various linear algebra computations.

As a particular example, the hardware accelerator 120 can be a TPU or other accelerator that includes a systolic array circuit for performing multiplication in hardware. For example, the systolic array can be an array of multiply accumulate units (MACs) that performs matrix multiplication in hardware using any of a variety of computation paradigms, e.g., output stationary or input stationary computation.

As a particular example, the hardware accelerator 120 can be a GPU or other accelerator that includes a tensor core circuit for performing multiplication in hardware.

Generally, the hardware accelerator 120 can perform certain floating point operations that are accelerated by dedicated circuitry ("hardware") on the accelerator. One example of these floating point operations is, as described above, matrix multiplication.

The performance of the accelerator 120 is therefore in part bounded by the arithmetic intensity of these floating point operations and the peak memory bandwidth of the accelerator 120.

The hardware accelerator 120 can also perform other coefficient-wise operations (COPs)—examples of such operations include vectorized add operations, multiply operations, compare operations, conditional-move operations, and so on. However, these COPs are generally computationally expensive for the accelerator to perform for a variety of reasons, e.g., because they require processing additional instructions in addition to the matrix multiplication instructions that are required to perform multiplication and only a limited number of additional instructions are available before a lack of instruction bandwidth bottlenecks the performance of the accelerator.

The performance of the accelerator 120 is therefore also bounded by the instruction throughput intensity, which is the ratio of floating point operations to COPs. In particular, having COPs per floating point operation can allow the accelerator 120 to achieve better performance on a given computational workload because it reduces the likelihood that instruction bandwidth will serve as a bottleneck.

The system 100 performs the KNN search in a manner that optimizes the performance of the kNN search by minimizing the number of COPs that are required to be performed as part of the search.

In other words, the system 100 uses the accelerator 120 to perform the search in a manner that accounts for the limited coefficient-wise instruction bandwidth of the hardware accelerator 120 and prevents this limited bandwidth from bottlenecking the efficiency of the search.

Performing the search using the hardware accelerator 120 is described in more detail below with reference to FIGS. 2 and 3.

Figure 2:
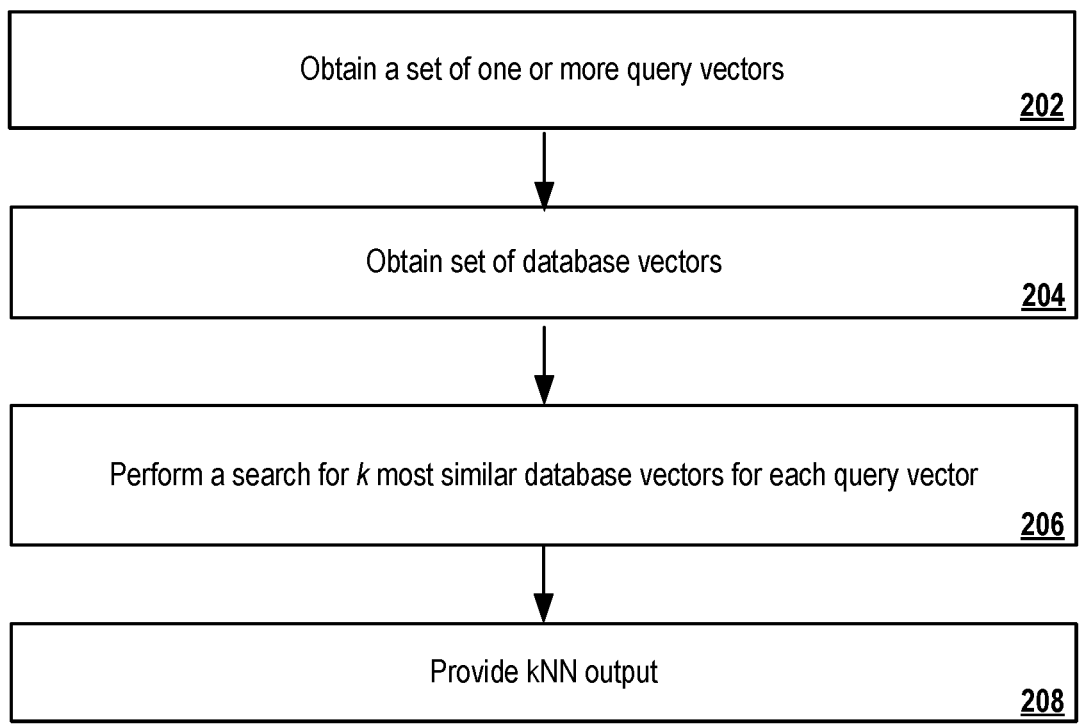
FIG. 2 illustrates an example process for performing a kNN computation.

FIG. 2 illustrates an example process 200 for performing a kNN computation. For example, a system, e.g., the system 100 of FIG. 1, appropriately programmed, can perform the process 200.

The system obtains a set of one or more query vectors (step 202).

The system obtains a set of database vectors (step 204). Each database vector has a respective index, i.e., a respective identifier that uniquely identifies the database vector within the set.

Generally, the database vectors are partitioned into a plurality of bins based on the indices, i.e., such that each bin is made up of a set of database vectors that have consecutive indices.

In some implementations, the system selects the total number of bins. For example, the system can select the total number of bins based on a target recall for the kNN search, with larger numbers of bins resulting in a higher recall and smaller number of bins resulting in a lower recall.

In some other implementations, the system receives the total number of bins as input.

The system performs, on a hardware accelerator and for each query vector in the set, a search for the k most similar database vectors to the query vector according to a similarity measure (step 206).

The similarity measure can be any appropriate similarity measure and can be specified by the request for the kNN search or can be predetermined. Examples of similarity measures include inner product similarity, cosine similarity, and Euclidean distance.

In particular, as part of the search, the system computes, by the circuitry of the hardware accelerator and for each query vector, a respective similarity value between the query vector and each database vector according to the similarity measure.

In particular, the system can compute the similarity values at least in part by computing, by circuitry of the hardware accelerator and for each query vector, a respective dot product between the query vector and each database vector. In particular, the system can compute these dot products using the matrix multiplication circuitry of the accelerator.

As a particular example, the system can compute the respective dot products using vectorized fused-multiply-add operations performed by the circuitry of the hardware accelerator. A fused-multiply-add operation is a floating-point multiply-add operation performed in one step, with a single rounding.

That is, where an unfused multiply-add that attempts to compute the expression a+(b×c) would compute the product of b and c, round the product to a specified number of significant bits, add the result to a, and round back to the specified number of significant bits, a fused multiply-add computes the entire expression, i.e., a+(b×c), to its full precision before rounding the final result down to N significant bits.

The fused-multiply-add operation is referred to as "vectorized" because the hardware accelerator performs at least a portion of the operation in parallel for each of the plurality of pairs rather than, e.g., performing the operation sequentially by iterating through a loop. For example, the accelerator can perform the multiplication operations as an element-wise operation between the two vectors and then accumulate the results, both using the multiplication circuitry of the accelerator, e.g., using a set of MACs of a systolic array.

For each query vector, the system identifies, by the hardware accelerator and for each bin, (i) an index of the most similar database vector within the bin and (ii) the respective similarity value for the most similar database vector within the bin.

Thus, if there are L bins, the system identifies L most similar database vectors, with each being the most similar database vector within the corresponding bin. Thus, the system collects the top-1 similarities for each of the L bins. Thus, the larger the number of bins, the larger the expected recall of the algorithm, i.e., because the likelihood that the second most similar database vector is one of the top k most similar database vectors across all of the bins decreases as the number of vectors per bin decreases.

Identifying the most similar database vectors within the bin is described below with reference to Table 1 and FIG. 3.

limited coefficient-wise instruction bandwidth of the accelerator and maintain high computational efficiency of the search.

In some implementations, the system further optimizes the algorithm shown in Table 1 to exploit temporal and spatial locality when making use of the accelerator memory, e.g., of an on-chip cache of the hardware accelerator.

This further optimization will be described in more detail below with reference to Table 2.

The system then provides an output of the kNN search (step 208).

In some implementations, the system provides the L most similar database vectors as the output of the kNN search. For example, if L is larger than k, the system can provide an output identifying the L most similar database vectors to the system from which the query vectors were received and the other system can refine the L most similar database vectors to a final set of k database vectors.

In some other implementations, the system further refines the L most similar database vectors. In particular, the system can select, by the hardware accelerator, k database vectors from the L most similar database vectors within the plurality of bins.

In particular, the system can sort the most similar database vectors within the plurality of bins based on the respective similarity measures to generate a sorted list of the most similar database vectors. For example, the system can perform a bitonic sort of the most similar database vectors within the plurality of bins to generate the sorted list.

The system then performs a truncation on the sorted list of the most similar database vectors to identify the k most similar database vectors from the sorted most similar database vectors. That is, the system truncates the sorted list to include only the first k database vectors in the sorted list.

TABLE 1

Algorithm 1: PartialReduce for MIPS

Input: $Q \in R^{M \times D}$ Batch queries
Input: $X \in R^{N \times D}$ Database
Input: $2^W$ Bin size
Output: $V \in R^{M \times L}$ Top-K values
Output: $A \in N^{M \times L}$ Top-K indices
1 for i ← 1 to M do
2     for j ← 1 to N do
3        $y_{i,j} \leftarrow (q_i, x_j)$ ;
4        l ← ShiftRight(j, W) ;  /* Unrolled and does not cost COP */
5        $b \leftarrow y_{i,j} > v_{i,l}$ ;  /* COP 1: Vectorized compare */
6        $v_{i,l} \leftarrow$ if b then $y_{i,j}$ else $v_{i,l}$ ;  /* COP 2: Vectorized conditional move */
7        $a_{i,l} \leftarrow$ if b then j else $a_{i,l}$ ;  /* COP 3: Vectorized conditional move */
8     end
9 end Table 1 shows an example of algorithm pseudo-code for performing the kNN search on an accelerator as described above.

As shown in Algorithm 1, the system iterates through the M query vectors and, for each query vector i, uses the ShiftRight operation to identify the bin Z to which a given database vector j belongs. The system then uses vectorized conditional moves to determine whether to update a first value a and second value v for the query vector i and for the identified bin/based on a similarity b between the query vector i and the database vector j.

This is described in more detail below.

As can be seen from Table 1, the described technique requires only three COPs for each floating point dot product, which allows the system to avoid bottlenecks due to the The system can then provide data identifying the first k database vectors as the output of the kNN computation.

Figure 3:
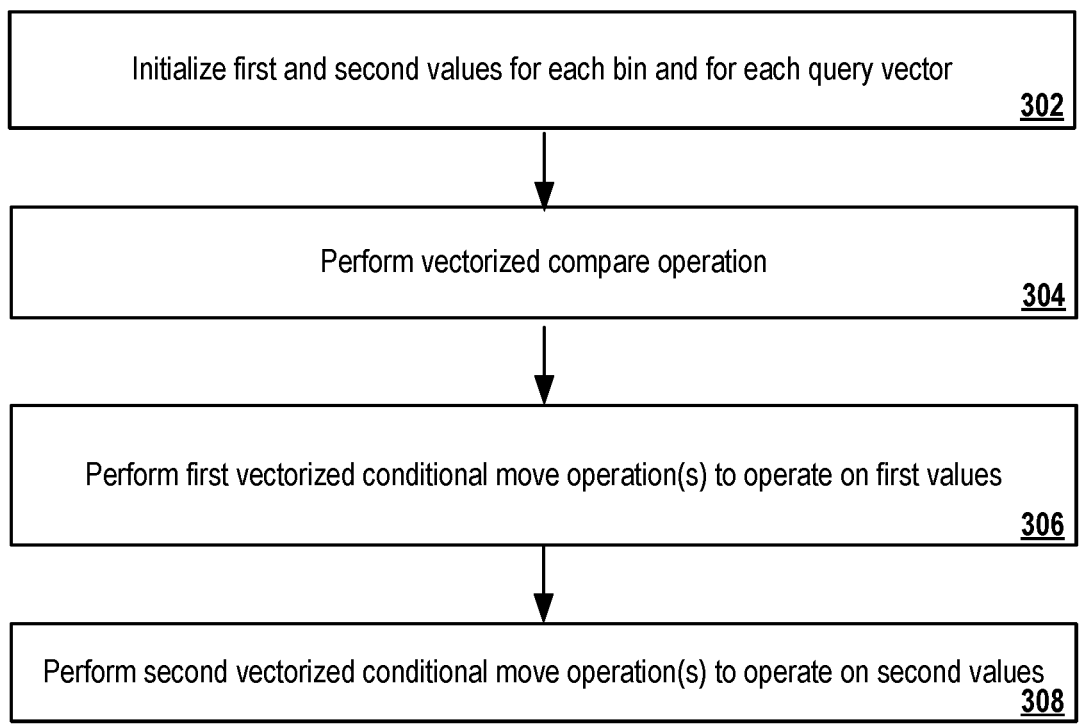
FIG. 3 illustrates an example process for identifying the most similar database vectors within each bin.

FIG. 3 illustrates an example process 300 for identifying the most similar database vectors within the plurality of bins. For example, a system, e.g., the system 100 of FIG. 1, appropriately programmed, can perform the process 300.

The system initializes, for each bin and for each query vector, a first value that identifies the index of the most similar database vector within the bin and a second value identifying the respective similarity measure for the most similar database vector within the bin (step 302). Thus, the system maintains, for each query vector, a respective first value for each bin that identifies the index of the most similar database vector within the bin to the query vector and a respective second value for each bin that represents the most similar database vector identified by the respective first value for the bin.

The system then repeatedly performs steps 304 through 308 to update the first and second values for the bins. For example, the system can perform steps 304 through 308 until the system has iterated through each database vector for each query vector.

After repeatedly performing steps 304-308, the system returns, for each query vector and for each bin, (i) an index of the most similar database vector within the bin by returning the first value for the query vector for the bin and (ii) the respective similarity value for the most similar database vector within the bin by returning the second value for the query vector for the bin.

At each iteration of steps 304-308, the system operates on a plurality of query vector-database vector pairs. For example, the plurality of pairs can be some or all of the pairs corresponding to the current inner iteration of Algorithm 2 that is shown in Table 2 below.

The system performs a vectorized compare operation to determine, for each of the plurality of query vector-database vector pairs, whether the similarity measure between the pair indicates that the pair is more similar than the most similar database vector identified by the first value for the query vector in the pair and for the bin to which the database vector in the pair belongs (step 304).

That is, the vectorized compare operation compares, for each query vector-database vector pair, the similarity measure between the pair to the similarity between the query vector in the pair and the most similar database vector identified by the first value for the query vector in the pair and for the bin to which the database vector in the pair belongs.

The compare operation is referred to as "vectorized" because the hardware accelerator performs the compare operation in parallel for each of the plurality of pairs rather than, e.g., performing the compare operation by iterating through a loop. For example, the accelerator can perform the compare operation as an element-wise operation between two vectors. In this case, one vector is a vector of similarities for the query vector-database vector pairs and the other vector is a vector of similarities for the query vector—most similar vector pairs.

The system then performs one or more first vectorized conditional move operations (step 306) to, for each of the plurality of query vector-database vector pairs, update the first value for the query vector in the pair and for the bin to which the database vector in the pair belongs to identify the database vector in the pair only if the similarity measure between the pair indicates that the pair is more similar than the most similar database vector identified by the first value for the query vector and for the bin to which the database vector in the pair belongs.

The move operation is referred to as "conditional" because the hardware accelerator only updates (or overwrites) a given stored first value for a given pair if the similarity measure between the pair indicates that the pair is more similar than the most similar database vector identified by the given first value. If the similarity measure between the pair does not indicate that the pair is more similar, the accelerator does not modify the stored first value.

The system also performs one or more second vectorized conditional move operations (step 308) to, for each of the plurality of query vector-database vector pairs, update the second value for the query vector and for the bin to which the database vector in the pair belongs to be equal to the similarity measure between the pair only if the similarity measure between the pair indicates that the pair is more similar than the most similar database vector identified by the first value for the query vector and for the bin to which the database vector in the pair belongs.

As above, the hardware accelerator only updates (or overwrites) a given stored second value for a given pair if the similarity measure between the pair indicates that the pair is more similar than the given second value. If the similarity measure between the pair does not indicate that the pair is more similar, the accelerator does not modify the stored second value.

As described above, in some implementations, the system further optimizes the algorithm shown above in Table 1 to exploit temporal and spatial locality when making use of the accelerator cache.

This further optimization is shown in Table 2.

TABLE 2

| Algorithm 2: Detailed PartialReduce kernel for MIPS |
|---|
| Input: $Q \in R^{M \times D}$ Batch queries |
| Input: $X \in R^{N \times D}$ Database |
| Input: $2^W$ Bin size |
| Output: $V \in R^{M \times L}$ Top-K values |
| Output: $A \in N^{M \times L}$ Top-K indices |
| /* Block iteration over colums   */ |
| 1  for ii ← 1 to M step ib do |
|      /* Block iteration over columns   */ |
| 2     for jj ← 1 to N step jb do |
|         /* i, j, k and / are often unrolled or even vectorized   */ |
| 3        for i ← ii to ii + ib − 1 do |
|            /* Starts the inner loop of the systolic arrays   */ |
| 4           $y_i \leftarrow 0$ ; |
| 5           for k ← 1 to D do |
| 6               $m \leftarrow q_{i,k}$ ; |
|                /* Vectorized FMA (fused-multiply-add)   */ |
| 7               for j ← jj to jj + jb − 1 do |
| 8                  $y_{i,j} \leftarrow y_{i,j} + m \cdot x_{j,k}$ ; |
| 9               end |
| 10           end |
|            /* Ends the inner loop of the systolic arrays   */ |
| 11           for j ← jj to jj + jb − 1 do |

TABLE 2-continued

Algorithm 2: Detailed PartialReduce kernel for MIPS

```
               /* The exact j → l mapping is determined by the compiler backend  */
12  |  |  |  |    / ← RegisterAlignedShiftRight (j, W) ;
13  |  |  |  |    b ← y_{i,j} > v_{i,l} ;           /* COP 1: Vectorized compare           */
14  |  |  |  |    v_{i,l} ← if b then y_{i,j} else v_{i,l} ; /* COP 2: Vectorized conditional move  */
15  |  |  |  |    a_{i,l} ← if b then j else a_{i,l} /* COP 3: Vectorized conditional move  */
16  |  |  |  end
17  |  |  end
18  |  end
19  end
```

As shown in Table 2, the set of query vectors includes a plurality of query vectors that are partitioned into a plurality of query blocks.

Each query block includes a respective plurality of query vectors and the system performs the search by searching for the query vectors in a respective query block at each of a plurality of outer iterations. That is, each outer iteration corresponds to a different query block.

At each outer iteration, the system computes, by the circuitry of the hardware accelerator and for each query vector in the query block for the outer iteration, a respective similarity value between the query vector and each database vector according to the similarity measure. That is, the system can perform the computation of the similarity values using vectorized FMA operations, e.g., using the systolic array, as described above.

For each query vector in the query block for the outer iteration, the system then identifies, by the hardware accelerator and for each bin, (i) an index of the most similar database vector within the bin and (ii) the respective similarity value for the most similar database vector within the bin, e.g., as described above with reference to FIG. 3.

Moreover, the set of database vectors can further be partitioned into a plurality of chunks. Each chunk includes a respective plurality of database vectors and each outer iteration includes a respective inner iteration for each of the plurality of chunks.

To perform a given inner iteration, the system computes, by the circuitry of the hardware accelerator and for each query vector in the query block for the outer iteration, a respective similarity value between the query vector and each database vector in the chunk corresponding to the inner iteration according to the similarity measure. That is, the system can perform the computation of the similarity values using a vectorized FMA operation, e.g., using the systolic array, as described above.

For each query vector in the query block for the outer iteration and for each database vector in the chunk for the inner iteration, the system then identifies, by the hardware accelerator and for each bin to which at least one of the database vectors in the chunk belongs, (i) an index of the most similar database vector within the bin and (ii) the respective similarity value for the most similar database vector within the bin, e.g., as described above with reference to FIG. 3.

Thus, the system exploits temporal locality by reusing previously accessed items. In particular, the system iterates by blocks of queries. The block of queries is reused in the inner loops, achieving the temporal locality.

The system exploits spatial locality by accessing items nearby previously accessed items. The block iteration loads a chunk of database vectors to achieve this optimization.

In some cases, the same block iteration structure may apply recursively for multiple cache hierarchies till the register level.

As described above, the inner loops (indexed by i, j, and k in line 3 of Table 2) are unrolled or vectorized so that every cycle can produce multiple results via SIMD (Single Instruction Multiple Data) instructions or systolic arrays.

In some cases, the operations of the processes 200 and 300 are part of a larger kNN computation and multiple accelerators within a set of accelerators perform the processes 200 and 300 with the same query vectors but on a different set of database vectors. In these cases, the host or another system can determine the output of the larger kNN computation from the outputs generated by the individual accelerators in the set.

Figure 4:
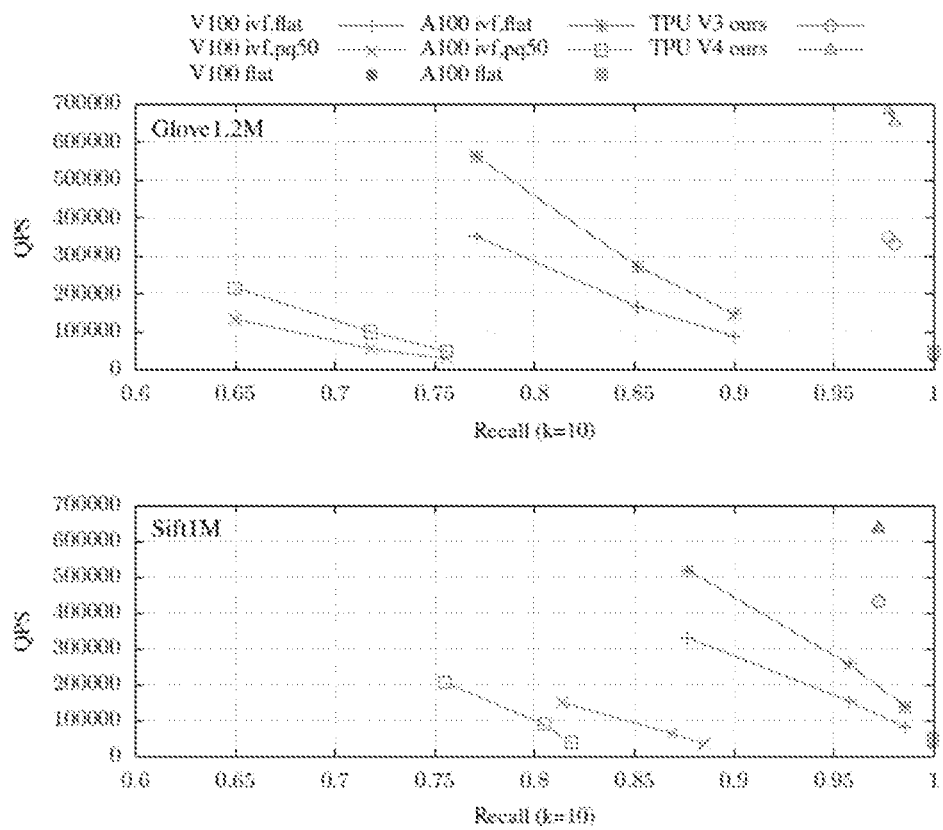
FIG. 4 shows the performance of the described techniques relative to existing techniques.

FIG. 4 shows an example 400 of the performance of the described techniques relative to existing techniques.

As shown in FIG. 4, given a target level of recall, the described techniques outperform conventional approaches.

In particular, FIG. 4 shows plots of the speed-recall trade-off on two data sets: Glove1.2M and Sift1M. Thus, up and to the right corresponds to improved performance, i.e., an ideal algorithm would be in the upper right hand corner of each of the two plots and have a recall of 1 and a QPS of 700,000.

Each plot shows the performance of two variants of the described techniques, one deployed on a TPUv3 chip and the other deployed on a TPUv4 chip. Each plot also shows the performance of three high-performing conventional approaches on a GPU V100 and on a GPU A100.

As can be seen from FIG. 4, for both data sets, both variants the described techniques outperform all six of the conventional approaches.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining a set of a plurality of query vectors, wherein the plurality of query vectors are partitioned into a plurality of query blocks that each comprise a respective plurality of query blocks;
    obtaining a set of database vectors, wherein each database vector has a respective index, and wherein the database vectors are partitioned into a plurality of bins based on the indices; and
    performing, on a hardware accelerator and for each query vector in the set, a search for k most similar database vectors to the query vector according to a similarity measure by searching for a respective query block at each of a plurality of outer iterations, and wherein each outer iteration comprises:
        computing, by circuitry of the hardware accelerator and for each query vector in the respective query block for the outer iteration, a respective similarity value between the query vector and each database vector according to the similarity measure; and
        for each query vector in the respective query block for the outer iteration, identifying, by the hardware accelerator and for each bin, (i) an index of the most similar database vector within the bin and (ii) the respective similarity value for the most similar database vector within the bin.

2. The method of claim 1, wherein the circuitry of the hardware accelerator that is used to compute the respective similarity values comprises a systolic array circuit for performing multiplication in hardware.

3. The method of claim 2, wherein the hardware accelerator is a tensor processing unit (TPU).

4. The method of claim 1, wherein the hardware accelerator is a graphics processing unit (GPU).

5. The method of claim 4, wherein the circuitry of the hardware accelerator that is used to compute the respective similarity values is a tensor core circuit for performing multiplication in hardware.

6. The method of claim 1, wherein the similarity measure is an inner product, a cosine similarity, or a Euclidean distance.

7. The method of claim 1, further comprising:
    providing data identifying the most similar database vectors within the plurality of bins as an output of the search.

8. The method of claim 1, further comprising:
    selecting, by the hardware accelerator, the k database vectors from the most similar database vectors within the plurality of bins.

9. The method of claim 8, wherein selecting, by the hardware accelerator, the k database vectors from the most similar database vectors within the plurality of bins comprises:
    sorting the most similar database vectors within the plurality of bins based on the respective similarity measures to generate a sorted list of the most similar database vectors; and
    performing a truncation on the sorted list of the most similar database vectors to identify the k most similar database vectors from the sorted most similar database vectors.

10. The method of claim 1, wherein computing, by circuitry of the hardware accelerator and for each query vector, a respective similarity value between the query vector and each database vector according to the similarity measure comprises:
    computing, by circuitry of the hardware accelerator and for each query vector in the respective query block for the outer iteration, a respective dot product between the query vector and each database vector.

11. The method of claim 10, wherein computing, by circuitry of the hardware accelerator and for each query vector in the respective query block for the outer iteration, a respective dot product between the query vector and each database vector comprises:
    computing the respective dot products using vectorized fused-multiply-add operations performed by the circuitry of the hardware accelerator.

12. The method of claim 1, wherein the set of database vectors are partitioned into a plurality of chunks, each chunk comprising a respective plurality of database vectors, and wherein each outer iteration comprises a respective inner iteration for each of the plurality of chunks, and wherein each inner iteration comprises:
    computing, by the circuitry of the hardware accelerator and for each query vector in the query block for the outer iteration, a respective similarity value between the query vector and each database vector in the chunk corresponding to the inner iteration according to the similarity measure.

13. The method of claim 1, wherein, for each query vector in the respective query block for the outer iteration, identifying, by the hardware accelerator and for each bin, (i) an index of the most similar database vector within the bin and (ii) the respective similarity value for the most similar database vector within the bin comprises:
    for each bin and for each query vector in the respective query block for the outer iteration, initializing a first value identifying the index of the most similar database vector within the bin and a second value identifying the respective similarity measure for the most similar database vector within the bin; and
    repeatedly performing operations comprising:
    performing a vectorized compare operation to determine, for each of a plurality of query vector-database vector pairs, whether the similarity measure between the pair indicates that the pair is more similar than the most similar database vector identified by the first value for the query vector in the pair and for the bin to which the database vector in the pair belongs;
    performing one or more first vectorized conditional move operations to, for each of the plurality of query vector-database vector pairs, update the first value for the query vector in the pair and for the bin to which the database vector in the pair belongs to identify the database vector in the pair only if the similarity measure between the pair indicates that the pair is more similar than the most similar database vector identified by the first value for the query vector and for the bin to which the database vector in the pair belongs; and
    performing one or more second vectorized conditional move operations to, for each of the plurality of query vector-database vector pairs, update the second value for the query vector and for the bin to which the database vector in the pair belongs to be equal to the similarity measure between the pair only if the similarity measure between the pair indicates that the pair is more similar than the most similar database vector identified by the first value for the query vector and for the bin to which the database vector in the pair belongs.

14. A system comprising one or more computers and one or more storage devices storing instructions that when executed by the one or more computers cause the one or more computers to perform operations comprising:
    obtaining a set of a plurality of query vectors, wherein the plurality of query vectors are partitioned into a plurality of query blocks that each comprise a respective plurality of query blocks;
    obtaining a set of database vectors, wherein each database vector has a respective index, and wherein the database vectors are partitioned into a plurality of bins based on the indices; and
    performing, on a hardware accelerator and for each query vector in the set, a search for k most similar database vectors to the query vector according to a similarity measure by searching for a respective query block at each of a plurality of outer iterations, and wherein each outer iteration comprises:
        computing, by circuitry of the hardware accelerator and for each query vector in the respective query block for the outer iteration, a respective similarity value between the query vector and each database vector according to the similarity measure; and
        for each query vector in the respective query block for the outer iteration, identifying, by the hardware accelerator and for each bin, (i) an index of the most similar database vector within the bin and (ii) the respective similarity value for the most similar database vector within the bin.

15. The system of claim 14, the operations further comprising:
    providing data identifying the most similar database vectors within the plurality of bins as an output of the search.

16. The system of claim 14, the operations further comprising:
    selecting, by the hardware accelerator, the k database vectors from the most similar database vectors within the plurality of bins.

17. The system of claim 16, wherein selecting, by the hardware accelerator, the k database vectors from the most similar database vectors within the plurality of bins comprises:
    sorting the most similar database vectors within the plurality of bins based on the respective similarity measures to generate a sorted list of the most similar database vectors; and performing a truncation on the sorted list of the most similar database vectors to identify the k most similar database vectors from the sorted most similar database vectors.

18. The system of claim 14, wherein computing, by circuitry of the hardware accelerator and for each query vector in the respective query block for the outer iteration, a respective similarity value between the query vector and each database vector according to the similarity measure comprises:
    computing, by circuitry of the hardware accelerator and for each query vector in the respective query block for the outer iteration, a respective dot product between the query vector and each database vector.

19. One or more non-transitory computer-readable storage media storing instructions that when executed by one or more computers cause the one or more computers to perform operations comprising:

obtaining a set of a plurality of query vectors, wherein the plurality of query vectors are partitioned into a plurality of query blocks that each comprise a respective plurality of query blocks;

obtaining a set of database vectors, wherein each database vector has a respective index, and wherein the database vectors are partitioned into a plurality of bins based on the indices; and performing, on a hardware accelerator and for each query vector in the set, a search for k most similar database vectors to the query vector according to a similarity measure by searching for a respective query block at each of a plurality of outer iterations, and wherein each outer iteration comprises:

computing, by circuitry of the hardware accelerator and for each query vector in the respective query block for the outer iteration, a respective similarity value between the query vector and each database vector according to the similarity measure; and for each query vector in the respective query block for the outer iteration, identifying, by the hardware accelerator and for each bin, (i) an index of the most similar database vector within the bin and (ii) the respective similarity value for the most similar database vector within the bin.

20. The system of claim 18, wherein computing, by circuitry of the hardware accelerator and for each query vector in the respective query block for the outer iteration, a respective dot product between the query vector and each database vector comprises:

computing the respective dot products using vectorized fused-multiply-add operations performed by the circuitry of the hardware accelerator.

* * * * *